(12) United States Patent
Pantaleano et al.

(10) Patent No.: US 11,151,503 B2
(45) Date of Patent: Oct. 19, 2021

(54) MOBILE COMPUTING APPLICATION FOR INDUSTRIAL AUTOMATION MANUFACTURING DATA

(71) Applicant: ROCKWELL AUTOMATION TECHNOLOGIES, INC., Mayfield Heights, OH (US)

(72) Inventors: Michael J. Pantaleano, Willoughby, OH (US); George K. Peters, Rancho Santa Margarita, CA (US); Matthew C. Giordano, Powell, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1025 days.

(21) Appl. No.: 14/268,849

(22) Filed: May 2, 2014

(65) Prior Publication Data

US 2015/0317591 A1 Nov. 5, 2015

(51) Int. Cl.
*G06Q 10/06* (2012.01)
(52) U.S. Cl.
CPC .............. *G06Q 10/06393* (2013.01)
(58) Field of Classification Search
CPC ........................................ G06Q 10/06393
USPC ........................................... 705/7.39
See application file for complete search history.

(56) References Cited

U.S. PATENT DOCUMENTS

| 7,963,327 B1 | 6/2011 | Saleri et al. |
| 2009/0089701 A1 | 4/2009 | Baier et al. |
| 2010/0082125 A1* | 4/2010 | Pingel ................ G05B 23/0272 700/47 |
| 2013/0138723 A1* | 5/2013 | Ku ...................... G06F 3/04817 709/203 |
| 2013/0145286 A1* | 6/2013 | Feng ..................... G06Q 50/01 715/753 |

OTHER PUBLICATIONS

Mohd (Khairul Hafiz bin Mohd, The Development of Key Performance Indicator (KPI) Portal, Dissertation, Universiti Teknologi Petronas, Jul. 2009).*
Schauland, Derek, "Microsoft Surface Pro 2 101: Customize your Start screen", Nov. 18, 2013, XP055210272, Retrieved from the Internet: URL:http://www.techrepublic.com/blog/tablets-in-the-enterprise/microsoft-surface-pro-2-101-customize-your-start-screen/ [retrieved on Aug. 31, 2015].
Kovach, Steve, "Review: The Microsoft Surface Tablet", Oct. 30, 2012, XP055210275, Retrieved from the Internet: URL:http://www.businessinsider.com/microsoft-surface-review-2012-10?IR=T [retrieved on Aug. 31, 2015].
Summons to Attend Oral Proceedings Pursuant to Rule 115(1) EPC issued by the European Patent Office for Application No. 15 165 941.4-1213 on Mar. 18, 2021, 10 pages.

* cited by examiner

*Primary Examiner* — Matthew D Henry

(57) ABSTRACT

Systems, methods, and software to facilitate visualization of an application associated with an industrial automation environment are disclosed herein. In at least one implementation, a graphical user interface to the application having a plurality of key performance indicators (KPIs) is rendered. A selection of at least one KPI of the plurality of KPIs is received along with instructions to link the at least one KPI to a home screen of an operating system. Dynamic KPI data associated with the at least one KPI is fed to the operating system for visualization of the at least one KPI on the home screen.

20 Claims, 8 Drawing Sheets

FIGURE 8

MOBILE COMPUTING APPLICATION FOR INDUSTRIAL AUTOMATION MANUFACTURING DATA

TECHNICAL FIELD

Aspects of the disclosure are related to computing hardware and software technology, and in particular to industrial automation applications.

TECHNICAL BACKGROUND

Industrial automation environments typically include machines that continually produce operational data over time, such as the machine's pressure, temperature, speed, and other metrics. This operational data may be provided for display on a variety of systems and devices, such as notebook or tablet computers running standalone applications, web browsers, and the like, in order to present the information to the user.

The advent of tablet computers with touch screens has resulted in operating systems that take advantage of the unique features of a tablet. For example, some operating systems for tablet computers provide live tiles, icons, or other graphical representations which continually receive updated data from external data sources and display this information dynamically. In some instances, a user may be able to pin an application to the start screen of the operating system to create a live tile, and programmatically predetermined information will be continuously provided by the application for display on the live tile as the information is updated over time.

OVERVIEW

Provided herein are systems, methods, and software to facilitate visualization of an application associated with an industrial automation environment. In at least one implementation, a graphical user interface to the application having a plurality of key performance indicators (KPIs) is rendered. A selection of at least one KPI of the plurality of KPIs is received along with instructions to link the at least one KPI to a home screen of an operating system. Dynamic KPI data associated with the at least one KPI is fed to the operating system for visualization of the at least one KPI on the home screen.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for improved visualizations of information items associated with applications executing on a computing system. In one implementation, an application associated with an industrial automation environment may display a graphical user interface showing one or more key performance indicators (KPIs) related to industrial operations. For example, the graphical user interface could display KPIs related to operational data associated with machines in the industrial automation environment, such as parameters, pressures, temperatures, speeds, production rates, or some other status metrics. In some examples, the operational data for some KPIs may comprise dynamic charts or trends, real-time video, or some other graphical content.

By interacting with the graphical user interface, a user may select one or more of the KPIs displayed by the application, and may further provide an instruction to link or "pin" the one or more KPIs selected to a home screen of an operating system executing on the computing system. When a KPI is pinned to the home screen of the operating system, an icon, tile, widget, or some other graphical representation of the KPI is typically displayed on the home screen. The application may then provide a "live feed" of dynamic KPI data to the operating system for display within the graphical representation of the KPI that is pinned to the home screen. This feed of dynamic KPI data may be continuously updated by the application so that the visualization of the KPI displayed on the home screen shows the most current information associated with the KPI.

Figure 1:
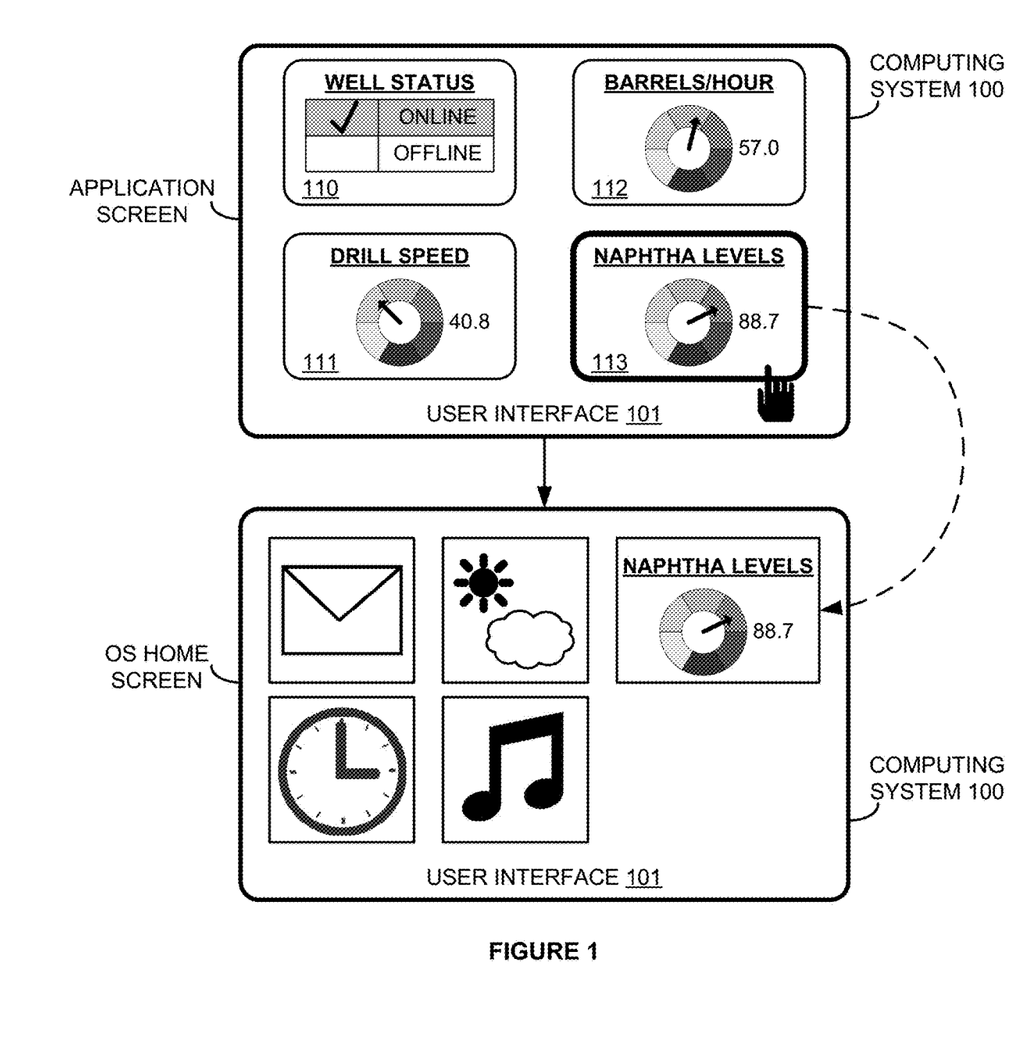
FIG. 1 is a block diagram that illustrates an operational scenario involving a computing system in an industrial automation environment in an implementation.
Figure 2:
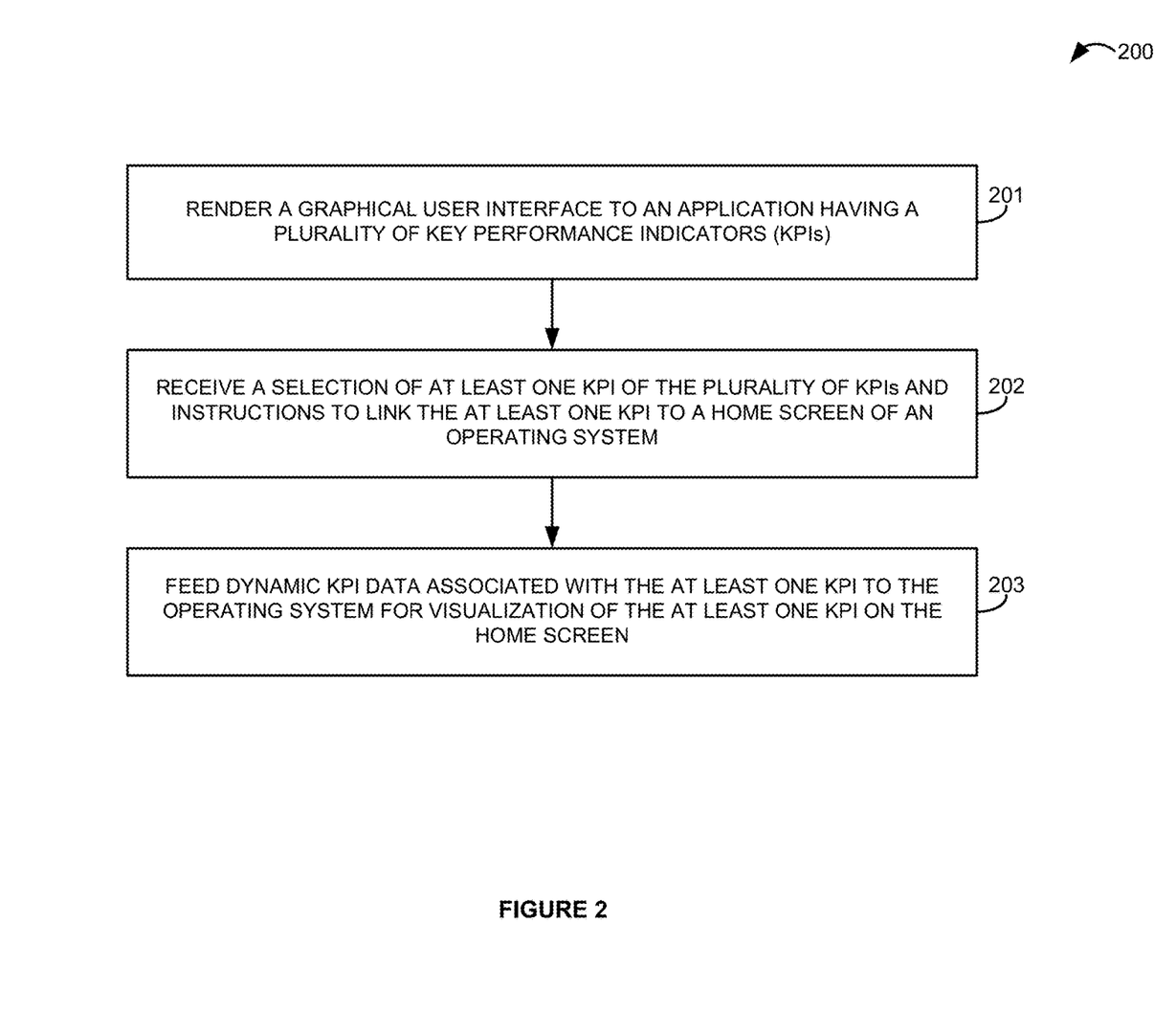
FIG. 2 is a flow diagram that illustrates an operation of a computing system in an exemplary implementation.
Figure 3:
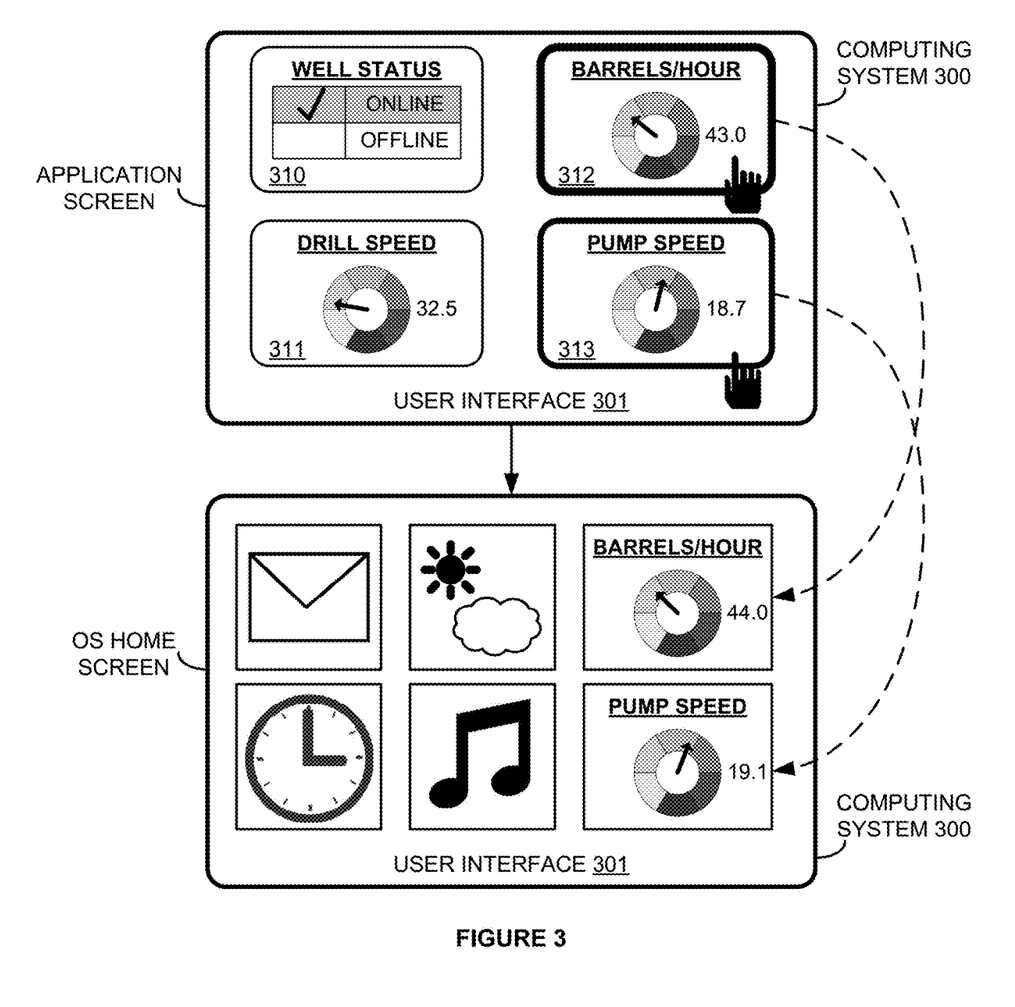
FIG. 3 is a block diagram that illustrates an operational scenario involving a computing system in an industrial automation environment in an exemplary implementation.
Figure 4:
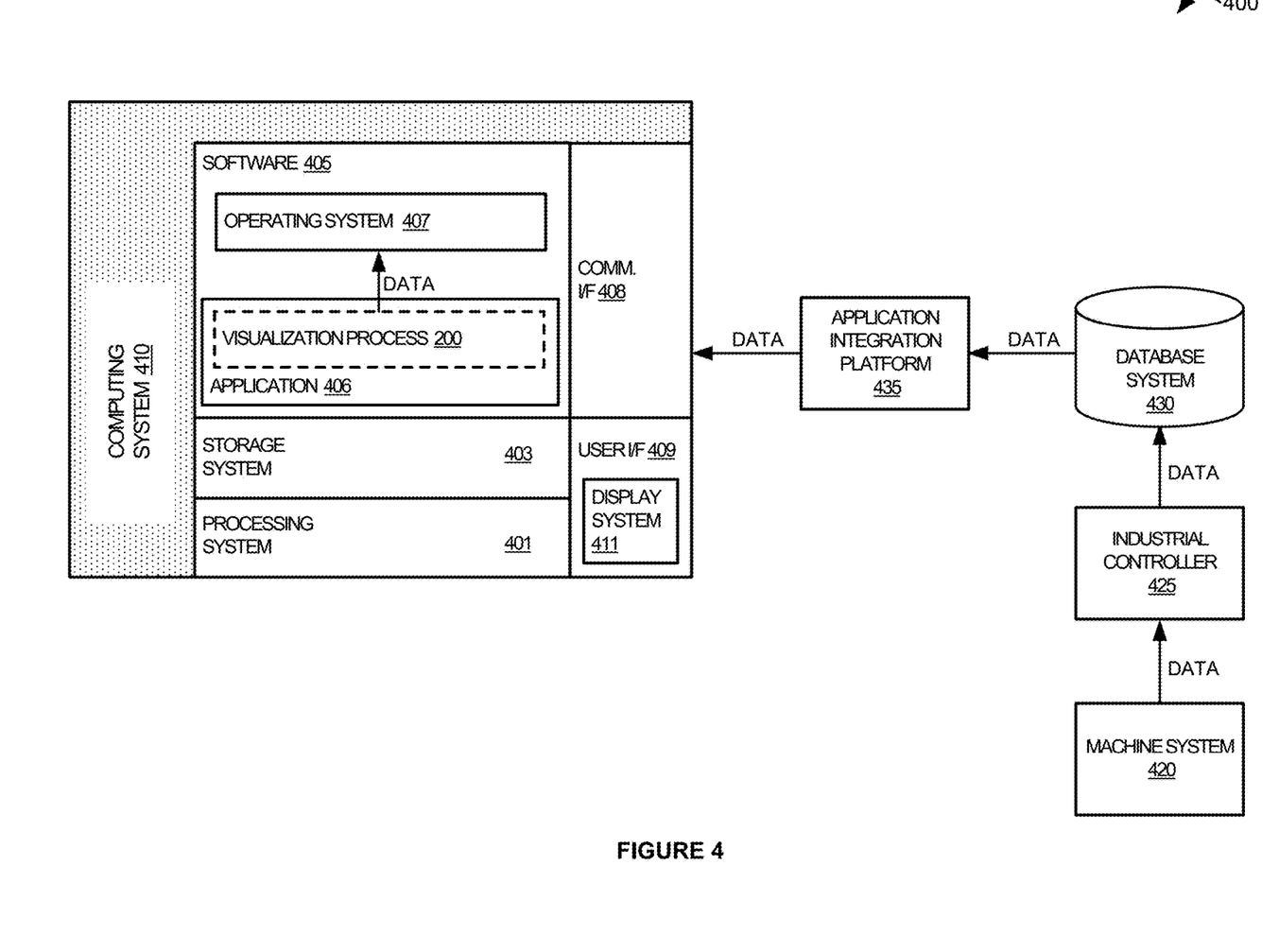
FIG. 4 is a block diagram that illustrates an industrial automation environment in an exemplary implementation.
Figure 5:
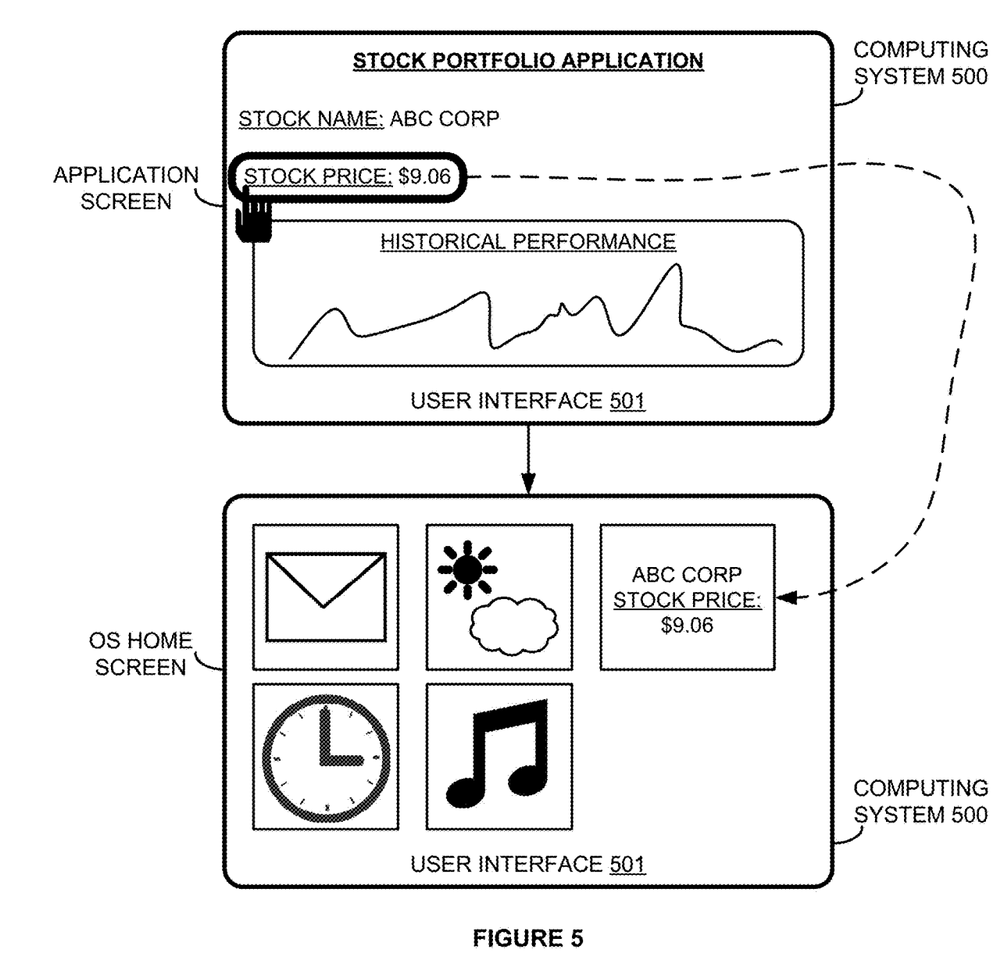
FIG. 5 is a block diagram that illustrates an operational scenario involving a computing system in an exemplary implementation.
Figure 6:
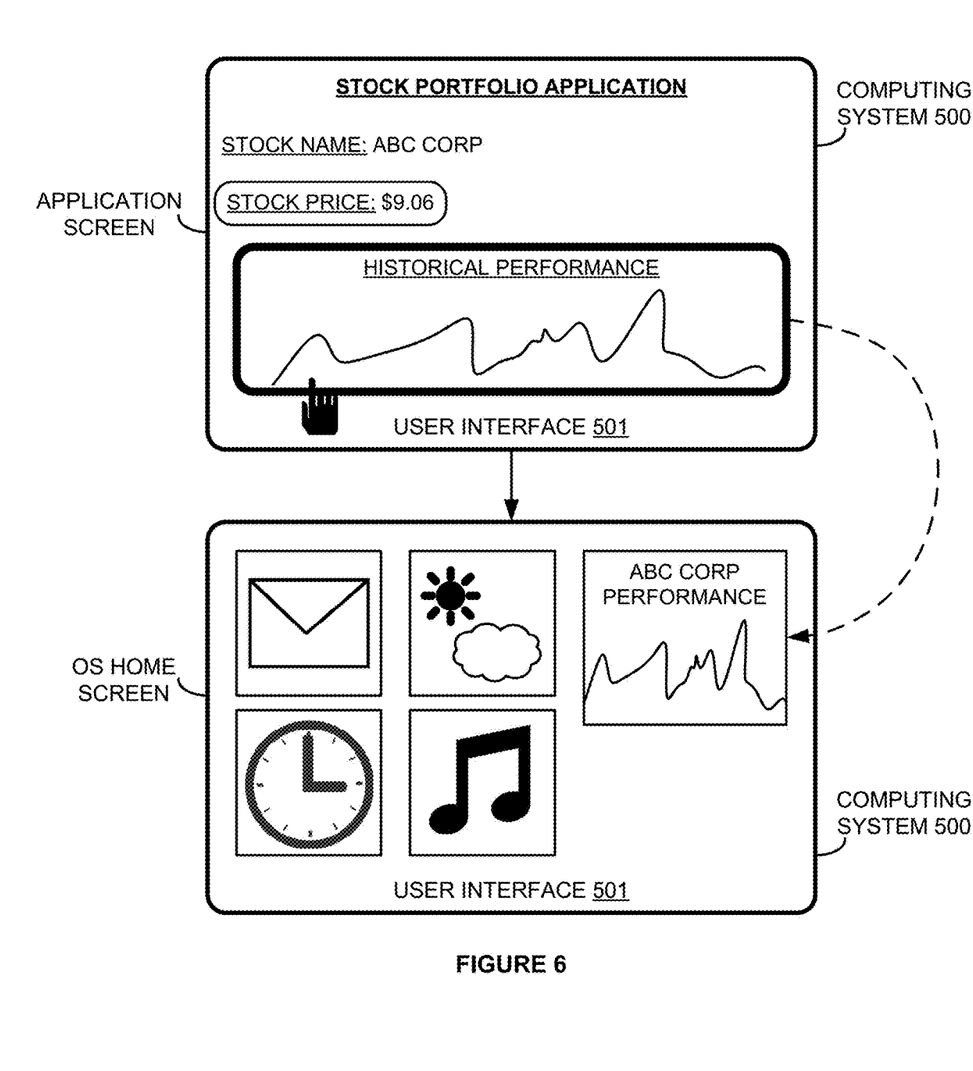
FIG. 6 is a block diagram that illustrates an operational scenario involving a computing system in an exemplary implementation.
Figure 7:
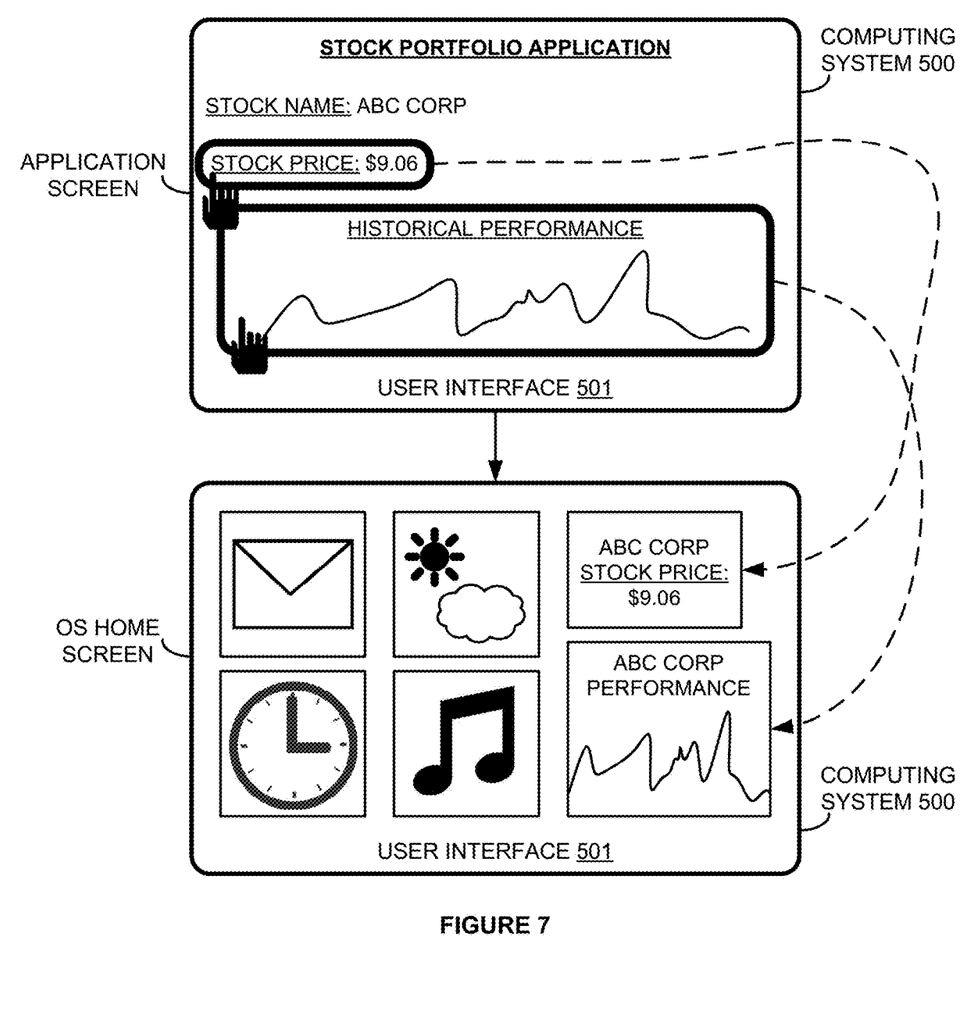
FIG. 7 is a block diagram that illustrates an operational scenario involving a computing system in an exemplary implementation.
Figure 8:
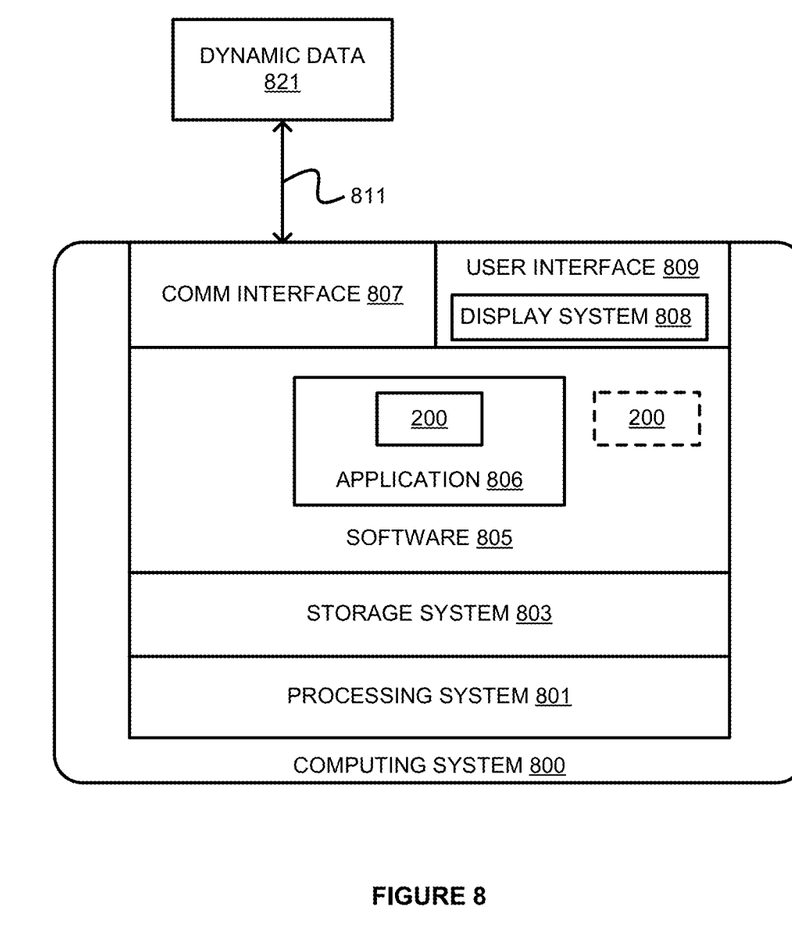
FIG. 8 is a block diagram that illustrates a computing system in an exemplary implementation.

Referring now to the drawings, FIGS. 1 and 3 illustrate operational scenarios in which a user interacts with an application through a graphical user interface to select specific KPIs of the application according to a visualization process. FIG. 2 illustrates the visualization process, while FIG. 4 illustrates an exemplary industrial automation environment that includes a computing system that may be used to execute the application and its visualization process. FIG. 5-7 illustrate several operational scenarios involving a computing system according to various exemplary implementations, and FIG. 8 illustrates an exemplary computing system that may be used to perform any of the visualization processes and operational scenarios described herein.

Turning now to FIG. 1, an operational scenario is illustrated involving computing system 100 in an industrial automation environment in an exemplary implementation. As shown in FIG. 1, computing system 100 includes user interface 101. In this example, user interface 101 comprises a touch screen that displays a graphical user interface for the user to interact with and accepts input commands from the user via the user's touch on the surface of the touch screen. However, user input could be provided by a variety of different techniques in other examples, such as entering text commands with a keyboard, clicking a mouse pointer, speaking a voice command, or any other user input mechanism. In FIG. 1, two different screens are shown displayed on user interface 101 of computing system 100. The screen appearing on the top of FIG. 1, labeled "application screen", shows a graphical user interface to an application executing on computing system 100. The screen appearing on the bottom of FIG. 1, labeled "OS home screen", provides a view of a home screen of an operating system (OS) executing on computing system 100. An operation involving computing system 100 will now be described with respect to the flow diagram of FIG. 2 in one exemplary implementation.

FIG. 2 is a flow diagram that illustrates an operation 200 of computing system 100 in an exemplary implementation. The operation 200 shown in FIG. 2 may also be referred to as visualization process 200 herein. The steps of the operation are indicated below parenthetically. The following discussion of visualization process 200 will proceed with reference to computing system 100 of FIG. 1 in order to illustrate its operations, but note that the details provided in FIG. 1 are merely exemplary and not intended to limit the scope of visualization process 200 to the specific implementation shown in FIG. 1.

Visualization process 200 may be employed to operate computing system 100 to facilitate visualization of an application associated with an industrial automation environment. As shown in the operation flow of visualization process 200, computing system 100 renders a graphical user interface to an application having a plurality of key performance indicators (KPIs) (201). An exemplary graphical user interface displaying four different KPIs is shown on user interface 101 labeled "application screen" appearing at the top of FIG. 1. In this example, the application is related to an oil extraction and processing industry, and includes KPIs for the well status 110, drill speed 111, barrels per hour 112, and naphtha levels 113. The well status KPI 110 indicates whether a well is online or offline, the drill speed KPI 111 indicates the speed of a drill, the barrels per hour KPI 112 indicates the number of barrels of crude oil that are being extracted from the well per hour, and the naphtha levels KPI 113 indicates the amount of petroleum naphtha being derived from the refinement of the extracted crude oil.

The graphical user interface that was rendered to the application in operational step 201 then receives a selection of at least one KPI of the plurality of KPIs and instructions to link the at least one KPI to a home screen of an operating system (202). In the example of FIG. 1, the hand icon appearing on the application screen represents the hand of a user touching the surface of user interface 101 to select the naphtha levels KPI 113. The bold boarder surrounding KPI 113 is used to indicate that the user has selected KPI 113 in this example. The user also provides instructions to link the at least one KPI to a home screen of an operating system executing on computing system 100. In some examples, the instruction to link the KPI to the home screen may be implied by the user's selection of the KPI 113. In other instances, the user may be presented with a button, menu, command prompt, or some other mechanism on user interface 101 in order to provide the instruction to link the selected KPI 113 to the home screen of the operating system. For example, after selecting the KPI 113, the user may be presented with a menu option, such as "pin to home", and the user could select this option in order to provide the instructions to link the selected KPI 113 to the home screen.

The application then feeds dynamic KPI data associated with the at least one KPI 113 to the operating system for visualization of the at least one KPI on the home screen (203). An exemplary home screen of an operating system is shown on user interface 101 of computing system 100 labeled "OS home screen" appearing at the bottom of FIG. 1. The OS home screen shows various tiles, icons, widgets, and other graphical representations, such as an envelope for an email application, a clock for a time application, an image of the sun and clouds for a weather application, and an image of musical notes for a musical application. In addition to these icons, the OS home screen now shows a visualization of naphtha levels that was linked from the naphtha levels KPI 113 appearing in the "application screen" shown above the "OS home screen." The user can then interact with this visualization of the naphtha levels KPI 113 appearing on the OS home screen in the typical ways, such as moving, resizing, removing, and the like. The application feeds dynamic KPI data associated with the naphtha levels KPI 113 to the operating system so that the visualization of the naphtha levels appearing on the OS home screen can be updated with the most current data for the naphtha levels. In this manner, the user is able to quickly and conveniently view the latest naphtha levels on the home screen of the operating system without having to access the application itself.

Advantageously, the application executing on computing system 100 provides a mechanism to link one or more KPIs 110-113 to the home screen of the operating system. For example, the user can decide which of the application's KPIs are most important and select them for more frequent and convenient viewing by linking them to the home screen. In this manner, the user is afforded the ability to customize what information appears on the home screen instead of being limited to the information that the application programmer predetermined for the entire application. The application then feeds live data for each of the KPIs that are linked to the home screen, so that the visualizations of these KPIs always provide the most current data on the home screen of the operating system.

FIG. 3 is a block diagram that illustrates an operational scenario involving computing system 300 in an industrial automation environment in an exemplary implementation. As shown in FIG. 3, computing system 300 includes user interface 301. In this example, user interface 301 comprises a touch screen that displays a graphical user interface for the user to interact with and accepts input commands from the user via the user's touch on the surface of the touch screen. Similar to FIG. 1, FIG. 3 also shows two different screens displayed on user interface 301 of computing system 300. The screen appearing on the top of FIG. 3, labeled "application screen", shows a graphical user interface to an application executing on computing system 300. The screen appearing on the bottom of FIG. 3, labeled "OS home screen", provides a view of a home screen of an operating system executing on computing system 300.

In the "application screen" appearing at the top of FIG. 3, an exemplary graphical user interface is shown displaying four different KPIs on user interface 301. In this example, the application is related to an oil extraction industry, and includes KPIs for the well status 310, drill speed 311, barrels per hour 312, and pump speed 313. The well status KPI 310 indicates whether a well is online or offline, the drill speed KPI 311 indicates the speed of a drill, the barrels per hour KPI 312 indicates the number of barrels of crude oil that are being extracted from the well per hour, and the pump speed KPI 313 indicates the rate that oil is being pumped from the well.

The operational scenario of FIG. 3 is similar to FIG. 1, except that in this implementation, the user has selected two KPIs 312 and 313 of the four KPIs 310-313 appearing on the application screen. In this example, the user has selected the barrels per hour KPI 312 and the pump speed KPI 313, as shown by the hand icon appearing on KPIs 312 and 313, along with the bold boarders around these KPIs 312 and 313. The user provides instructions to the application to link these KPIs 312 and 313 to the home screen of the operating system.

On the home screen of the operating system, labeled "OS home screen" appearing on the bottom of FIG. 3, visualizations for the barrels per hour KPI 312 and the pump speed KPI 313 of the application are shown. The dashed arrows from the application screen to the OS home screen indicate that these KPIs 312 and 313 are now linked to the home screen of the operating system. Note that the values for these KPIs have changed slightly since the user last viewed this information on the application screen. In the application screen, the barrels per hour KPI 312 was shown as 43.0, whereas the visualization of the barrels per hour KPI on the OS home screen now shows 44.0. Likewise, the pump speed KPI 313 was formerly 18.7 in the application screen, but is now shown as 19.1 in the visualization of the pump speed KPI in the OS home screen. This is because these values have changed and the application has dynamically provided the new values for these KPIs to the operating system, and the operating system updates the visualizations accordingly. Note that the application allows the user to select any number or combination of KPIs appearing on the application screen for linking to the home screen of the operating system, including all of the KPIs 310-313 in some examples.

FIG. 4 is a block diagram that illustrates an industrial automation environment 400 in an exemplary implementation. Industrial automation environment 400 provides an example of an industrial automation environment that may be utilized to implement visualization process 200, but other environments could also be used. Industrial automation environment 400 includes computing system 410, machine system 420, industrial controller 425, database system 430, and application integration platform 435. Machine system 420 and controller 425 are in communication over a communication link, controller 425 and database system 430 are in communication over a communication link, database system 430 and application integration platform 435 communicate over a communication link, and application integration platform 435 and computing system 410 are in communication over a communication link. Note that there would typically be many more machine systems in most industrial automation environments, but the number of machine systems shown in FIG. 4 has been restricted for clarity.

Industrial automation environment 400 comprises an automobile manufacturing factory, food processing plant, oil drilling operation, microprocessor fabrication facility, or some other type of industrial enterprise. Machine system 420 could comprise a sensor, drive, pump, filter, drill, motor, robot, fabrication machinery, mill, printer, or any other industrial automation equipment, including their associated control systems. A control system comprises, for example, industrial controller 425, which could include automation controllers, programmable logic controllers (PLCs), or any other controllers used in automation control. Additionally, machine system 420 could comprise other industrial equipment, such as a brew kettle in a brewery, a reserve of coal or other resources, or any other element that may reside in an industrial automation environment 400.

Machine system 420 continually produces operational data over time. The operational data indicates the current status of machine system 420, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 420 and/or controller 425 is capable of transferring the operational data over a communication link to database system 430, application integration platform 435, and computing system 410, typically via a communication network.

Database system 430 could comprise a disk, tape, integrated circuit, server, or some other memory device. Database system 430 may reside in a single device or may be distributed among multiple memory devices.

Application integration platform 435 comprises a processing system and a communication transceiver. Application integration platform 435 may also include other components such as a router, server, data storage system, and power supply. Application integration platform 435 may reside in a single device or may be distributed across multiple devices. Application integration platform 435 may be a discrete system or may be integrated within other systems—including other systems within communication system 100. In some examples, application integration platform 435 could comprise a FactoryTalk® VantagePoint® system provided by Rockwell Automation, Inc.

Computing system 410, referred to in FIG. 4, may be representative of any computing apparatus, system, or systems on which visualization process 200 or variations thereof may be suitably implemented. Computing system 410 provides an example of computing systems 100 and 300, although systems 100 and 300 could use alternative configurations. Examples of computing system 410 include mobile computing devices, such as cell phones, tablet computers, laptop computers, notebook computers, and gaming devices, as well as any other type of mobile computing devices and any combination or variation thereof. Examples of computing system 410 also include desktop computers, server computers, and virtual machines, as well as any other type of computing system, variation, or combination thereof.

Computing system 410 includes processing system 401, storage system 403, software 405, communication interface 408, and user interface 409. Processing system 401 is operatively coupled with storage system 403, communication interface 408, and user interface 409. Processing system 401 loads and executes software 405 from storage system 403. When executed by computing system 410 in general, and processing system 401 in particular, software 405 directs computing system 410 to operate as described herein for visualization process 200 or variations thereof. Computing system 410 may optionally include additional devices, features, or functionality not discussed here for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer readable storage media readable by processing system 401 and capable of storing software 405. Storage system 403 may include volatile and nonvolatile, removable and non-removable media implemented in any method or technology for storage of information, such as computer readable instructions, data structures, program modules, or other data. In addition to storage media, in some implementations storage system 403 may also include communication media over which software 405 may be communicated. Storage system 403 may be implemented as a single storage device but may also be implemented across multiple storage devices or sub-systems co-located or distributed relative to each other. Storage system 403 may comprise additional elements, such as a controller, capable of communicating with processing system 401.

Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

Software 405 includes application 406 and operating system 407. Application 406 may include visualization process 200 in some examples. Software 405 may be implemented in program instructions and among other functions may, when executed by computing system 410 in general or processing system 401 in particular, direct computing system 410 or processing system 401 to render a graphical user interface to application 406 having a plurality of KPIs, receive a selection of at least one KPI and instructions to link the at least one KPI to a home screen of operating system 407, and feed dynamic KPI data associated with the at least one KPI to operating system 407 for visualization of the at least one KPI on the home screen. In some examples, the plurality of KPIs may be associated with an operation of at least one machine system 420 in industrial automation environment 400. Software 405 may include additional processes, programs, or components, such as operating system software or other application software. Software 405 may also comprise firmware or some other form of machine-readable processing instructions executable by processing system 401.

In at least one implementation, in order to receive the selection of the at least one KPI and the instructions to link the at least one KPI to the home screen, the program instructions may direct processing system 401 to receive the selection and the instructions via the graphical user interface to the application. In some implementations, responsive to receiving the instructions to link the at least one KPI to the home screen, the program instructions may direct processing system 401 to pin the at least one KPI to the home screen of the operating system.

In at least some examples, the program instructions may further direct processing system 401 to display the graphical user interface to the application having the plurality of KPIs in response to a user selection of the visualization of the at least one KPI on the home screen of the operating system. In some cases, the program instructions may further direct processing system 401 to display a data source associated with the at least one KPI in response to a user selection of the visualization of the at least one KPI on the home screen of the operating system. In some implementations, to feed the dynamic KPI data associated with the at least one KPI to the operating system, the program instructions may direct processing system 401 to retrieve the dynamic KPI data from a data source associated with the at least one KPI and provide the dynamic KPI data to the operating system for visualization of the at least one KPI on the home screen.

In general, software 405 may, when loaded into processing system 401 and executed, transform computing system 410 overall from a general-purpose computing system into a special-purpose computing system customized to facilitate visualization of an application as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-storage media are characterized as primary or secondary storage.

In some examples, if the computer-storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 410 is generally intended to represent a computing system with which software 405 is deployed and executed in order to implement visualization process 200 (and variations thereof). However, computing system 410 may also represent any computing system on which software 405 may be staged and from where software 405 may be distributed, transported, downloaded, or otherwise provided to yet another computing system for deployment and execution, or yet additional distribution. For example, computing system 410 could be configured to deploy software 405 over the internet to one or more client computing systems for execution thereon, such as in a cloud-based deployment scenario.

Still referring to FIG. 4, communication interface 408 may include communication connections and devices that allow for communication between computing system 410 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 409 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 409. In this example, user interface 409 includes display system 411, which itself may be part of a touch screen that also accepts user inputs via touches on its surface. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

FIG. 5 is a block diagram that illustrates an operational scenario involving computing system 500 in an exemplary implementation. As shown in FIG. 5, computing system 500 includes user interface 501. In this example, user interface 501 comprises a touch screen that displays a graphical user interface for the user to interact with and accepts input commands from the user via the user's touch on the surface of the touch screen. In FIG. 5, two different screens are shown displayed on user interface 501 of computing system 500. The screen appearing on the top of FIG. 5, labeled "application screen", shows a graphical user interface to an application executing on computing system 500. The screen appearing on the bottom of FIG. 5, labeled "OS home screen", provides a view of a home screen of an operating system executing on computing system 500.

In this example, the application shown on the "application screen" is related to a stock portfolio of a user. The application displays several information items, including the name of the stock as "ABC Corp," the current stock price of $9.06, and a chart showing historical performance of the stock. In FIG. 5, the user has selected the "stock price" information item on the application screen of user interface 501, as shown by the hand icon that represents the user touching the "stock price" item, and the bold boarder surrounding the "stock price" information item which indicates the user's selection. The user also provides instructions to pin the "stock price" information item to the home screen of the operating system.

As shown on the "OS home screen" at the bottom of FIG. 5, a visualization of the stock price of $9.06 for ABC Corp is now shown on the home screen of the operating system. Since the "stock price" information item was pinned to the OS home screen, the stock portfolio application continually provides live data to the OS to update the stock price as it changes. Beneficially, the user can now monitor the price of the stock directly from the home screen of the operating system of computing system 500, without having to load the stock portfolio application to view this information.

Continuing the stock portfolio application example, FIG. 6 is a block diagram that illustrates a similar operational scenario involving computing system 500 in an exemplary implementation. In this example, the user has selected the chart of historical performance of the ABC Corp stock on the application screen of user interface 501, as shown by the hand icon that represents the user touching the "historical performance" graph, along with the bold boarder surrounding the "historical performance" information item to indicate the user's selection. The user also provides instructions to pin the "historical performance" information item to the home screen of the operating system.

As shown on the "OS home screen" at the bottom of FIG. 6, a visualization of the historical performance for ABC Corp is now shown on the home screen of the operating system. Since the "historical performance" information item was pinned to the OS home screen, the stock portfolio application will continually provide live data to the OS to update the chart of historical performance as it changes over time. Advantageously, the user can now monitor the historical performance of the stock directly from the home screen of the operating system of computing system 500, without having to load the stock portfolio application to view this information.

FIG. 7 is a block diagram that illustrates another operational scenario involving computing system 500 in an exemplary implementation. This example involves the same stock portfolio application as described above in FIGS. 5 and 6. The operational scenario of FIG. 7 is similar to FIGS. 5 and 6, except that in this instance, the user has selected two information items appearing on the application screen. In particular, the user has selected both the "stock price" and the "historical performance" information items, as shown by the hand icons appearing on the "stock price" and "historical performance" information items on the application screen, along with the bold boarders around these items. The user also provides instructions to the application to pin these information items to the home screen of the operating system.

On the home screen of the operating system, labeled "OS home screen" appearing on the bottom of FIG. 7, visualizations for the "stock price" of $9.06 for ABC Corp and the chart of historical performance are shown. The dashed arrows between the application screen and the OS home screen indicate that these information items are now linked to the home screen of the operating system. Note that the application allows the user to select any number or combination of information items appearing on the application screen for pinning to the home screen of the operating system, including all of information items as in this example. Since both the "stock price" and the "historical performance" information items are pinned to the OS home screen, the stock portfolio application will continually provide live data to the OS to update the stock price and the chart of historical performance as these values change over time. Favorably, the user can now monitor the price of the stock and its historical performance directly from the home screen of the operating system of computing system 500, without having to load the stock portfolio application to view this information.

FIG. 8 is a block diagram that illustrates computing system 800 in an exemplary implementation. Computing system 800 provides an example of computing systems 100, 300, and 500, although systems 100, 300, and 500 could use alternative configurations. Computing system 800 includes processing system 801, storage system 803, software 805, communication interface 807, and user interface 809. User interface 809 comprises display system 808. Software 805 includes application 806 which itself includes visualization process 200. Visualization process 200 may optionally be implemented separately from application 806.

Computing system 800 may be representative of any computing apparatus, system, or systems on which application 806 and visualization process 200 or variations thereof may be suitably implemented. Examples of computing system 800 include mobile computing devices, such as cell phones, tablet computers, laptop computers, notebook computers, and gaming devices, as well as any other type of mobile computing devices and any combination or variation thereof. Note that the features and functionality of computing system 800 may apply as well to desktop computers, server computers, and virtual machines, as well as any other type of computing system, variation, or combination thereof.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. When executed by computing system 800 in general, and processing system 801 in particular, software 805 directs computing system 800 to operate as described herein for visualization process 200 or variations thereof. Computing system 800 may optionally include additional devices, features, or functionality not discussed herein for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable media or storage media readable by processing system 801 and capable of storing software 805. Storage system 803 may include volatile and nonvolatile, removable and non-removable media implemented in any method or technology for storage of information, such as computer readable instructions, data structures, program modules, or other data. Storage system 803 may be implemented as a single storage device but may also be implemented across multiple storage devices or sub-systems co-located or distributed relative to each other. Storage system 803 may comprise additional elements, such as a controller, capable of communicating with processing system 801. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 809, processing system 801 loads and executes portions of software 805, such as visualization process 200, to render a graphical user interface for application 806 for display by display system 808 of user interface 809. Software 805 may be implemented in program instructions and among other functions may, when executed by computing system 800 in general or processing system 801 in particular, direct computing system 800 or processing system 801 to render a graphical user interface to application 806 having a plurality of information items, receive a selection of at least one information item and instructions to pin the at least one information item to a home screen of an operating system, and feed dynamic data 821 associated with the at least one information item to the operating system for visualization of the at least one information item on the home screen. In some examples, the plurality of information items could comprise a plurality of key performance indicators. Software 805 may include additional processes, programs, or components, such as operating system software or other application software. Examples of operating systems include Windows®, iOS®, and Android®, as well as any other suitable operating system. Software 805 may also comprise firmware or some other form of machine-readable processing instructions executable by processing system 801. In general, software 805 may, when loaded into processing system 801 and executed, transform computing system 800 overall from a general-purpose computing system into a special-purpose computing system customized to facilitate visualization of an application as described herein for each implementation.

Communication interface 807 may include communication connections and devices that allow for communication between computing system 800 and other computing systems (not shown) or services, over a communication network 811 or collection of networks. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 809 may include a voice input device, a touch input device for receiving a gesture from a user, a motion input device for detecting non-touch gestures and other motions by a user, and other comparable input devices and associated processing elements capable of receiving user input from a user. Output devices such as display system 808, speakers, haptic devices, and other types of output devices may also be included in user interface 809. The aforementioned user input devices are well known in the art and need not be discussed at length here. User interface 809 may also include associated user interface software executable by processing system 801 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable medium having stored thereon instructions that, in response to execution, cause a system comprising a processor to perform operations, the operations comprising:
   via an application associated with an industrial automation environment:
      rendering, in a graphical user interface (GUI) to the application, at least a first key performance indicator (KPI) of a plurality of KPIs associated with operations of the industrial automation environment and a second KPI of the plurality of KPIs;
      receiving one or more instructions to link at least the first KPI to a home screen of an operating system of a client computing device, wherein the home screen of the operating system is distinguished from the GUI to the application; and
      receiving one or more additional instructions to link at least the second KPI to the home screen of the operating system; and
   via the operating system:
      displaying, on the home screen of the operating system, a first visualization linked to KPI data associated with the first KPI, wherein the first visualization includes at least one of a dynamic graph, a dynamic trend, and a dynamic chart;
      displaying, on the home screen of the operating system, a second visualization linked to KPI data associated with the second KPI; and
      in response to receiving updated KPI data from the application, dynamically updating, on the home screen of the operating system and with the updated KPI data, the first visualization and the second visualization;
      wherein the application is configured to retrieve the updated KPI data live and from a data source associated with at least the first KPI.

2. The one or more non-transitory computer-readable medium of claim 1 wherein the operations further comprise rendering, in the GUI to the application, the second KPI comprising an aesthetic; and displaying, on the home screen of the operating system, the second visualization comprising the aesthetic.

3. The one or more non-transitory computer-readable medium of claim 1 wherein the operations further comprise, responsive to receiving the one or more instructions to link at least the first KPI to the home screen of the operating system, pinning at least the first KPI to the home screen of the operating system.

4. The one or more non-transitory computer-readable medium of claim 1 wherein the operations further comprise, in response to a selection of the first visualization or a selection of the second visualization, displaying the GUI to the application having the plurality of KPIs.

5. The one or more non-transitory computer-readable medium of claim 1 wherein the operations further comprise displaying, in response to a selection on the home screen of the operating system of the first visualization the data source.

6. The one or more non-transitory computer-readable medium of claim 5 wherein the data source comprises a machine system operating in the industrial automation environment.

7. The one or more non-transitory computer-readable medium of claim 1 wherein the plurality of KPIs are associated with an operation of at least one machine system in the industrial automation environment.

8. A method for facilitating visualization of an application associated with an industrial automation environment, the method comprising:
   via the application:
      rendering, by a system comprising a processor and in a graphical user interface (GUI) to the application, at least a first key performance indicator (KPI) of a plurality of KPIs associated with operations of the industrial automation environment and a second KPI of the plurality of KPIs;
      receiving, by the system, one or more instructions to link at least the first KPI and the second KPI to a home screen of an operating system of the system;
   via the operating system:
      displaying, on the home screen of the operating system:
         a first visualization linked to KPI data associated with the one first KPI, wherein the first visualization includes at least one of a dynamic graph, a dynamic trend, and a dynamic chart; and
         a second visualization linked to KPI data associated with the second KPI; and
      in response to receiving updated KPI data from the application, dynamically updating, on the home screen of the operating system and with the updated KPI data, the first visualization and the second visualization;
      wherein the application is configured to retrieve the updated KPI data live and from a data source associated with at least the first KPI.

9. The method of claim 8 wherein receiving the one or more instructions comprises receiving the one or more instructions via the GUI to the application.

10. The method of claim 8 further comprising, responsive to receiving the one or more instructions, pinning at least the first KPI to the home screen of the operating system.

11. The method of claim 8 further comprising displaying, in response to a selection of the first visualization, the GUI to the application having the plurality of KPIs.

12. The method of claim 8 further comprising displaying, in response to a selection of the first visualization, the data source.

13. The method of claim 12 wherein the data source comprises a machine system operating in the industrial automation environment.

14. The method of claim 12 wherein the data source comprises an industrial controller system associated with the industrial automation environment.

15. The method of claim 8 wherein the plurality of KPIs are associated with an operation of at least one machine system in the industrial automation environment.

16. A system for facilitating visualization of an application associated with an industrial automation environment, the system comprising:
- a memory that stores executable components; and
- a processor, operatively coupled to the memory, that executes the executable components, the executable components comprising:
  - an application interface component configured to:
    - render, in a graphical user interface (GUI) to the application, a first information item of a plurality of information items of the application and a second information item of the plurality of information items; and
    - receive one or more instructions to pin, to a home screen of an operating system, at least the first information item and the second information item, wherein the home screen of the operating system is distinguished from the GUI to the application; and
  - an operating system component configured to:
    - enable display, on the home screen of the operating system, of a first visualization linked to data associated with the first information item and a second visualization linked to data associated with the second information item; and
    - responsive to receiving live data from the application interface component, enable display, on the home screen of the operating system, of an update to the first visualization and the second visualization; and
  - a data acquisition component operatively coupled to the application interface component and configured to obtain the live data from a data source associated with at least the one first information item, and in response to obtaining the live data, transmitting the live data to the application interface component.

17. The system of claim 16 wherein the data source comprises a machine system operating in the industrial automation environment.

18. The system of claim 17 wherein the operating system component is further configured to display, in response to a selection of the first visualization, the data source.

19. The system of claim 16 wherein the application interface component is further configured to, in response to a selection of the first visualization or a selection of the second visualization, enable display of the GUI to the application having the plurality of information items.

20. The system of claim 16 wherein the second information item comprises an aesthetic, and wherein the operating system is further configured to enable display, on the home screen of the operating system, of the second visualization having the aesthetic.

* * * * *